United States Patent Office 3,280,175
Patented Oct. 18, 1966

3,280,175
PREPARATION OF ORGANIC ESTERS FROM ORGANIC HALIDES AND MIXED ORGANIC ANHYDRIDES
Walter E. Kramer, Niles, and Robert C. Kimble, Crystal Lake, Ill., assignors, by mesne assignments, to Union Oil Company of California, Los Angeles, Calif., a corporation of California
No Drawing. Filed Dec. 16, 1963, Ser. No. 330,625
9 Claims. (Cl. 260—476)

This invention relates to a method of preparing esters of organic acids by reaction of mixed organic acid anhydrides with halides of organic compounds having an activated halogen group. More particularly this invention relates to a method of preparing esters of organic acids by reacting mixed acid anhydrides with active halogen compounds in the presence of a catalyst such as antimony pentasulfide, phosphorus pentasulfide or phosphorus pentoxide under conditions such that one of the acyl halides formed from the mixed anhydride boils at a higher temperature than the other, whereby the lower boiling acyl halide is removed from the reaction mixture and the ester product predominates in the desired ester of the higher molecular weight acid of the mixture acid anhydride. This invention is applicable to any stable organic halide having one or more active halogen atoms in the molecule and to any mixed anhydride of an organic acid, provided these reactants do not contain interfering groups as are known in this art. Thus the invention is directed to the preparation of organic acid esters from active halides of aromatic, alicyclic olefinic, allylic olefinic, heterocyclic, and acetylenic compounds as hereinafter more fully defined.

In the prior art, it is known to react benzyl chloride with acetic anhydride to form benzyl acetate. This reaction takes place at elevated temperatures in the presence of catalysts such as oxides, carbonates, and chlorides of zinc, bismuth, and cobalt. The prior art process, which is carried out with equimolar amounts of benzyl chloride and acetic anhydride, results in the formation of one mole of benzyl acetate and one mole of acetyl chloride.

However, in carrying out the process of the prior art we have found that the yields are low and that excessive charring and polymerization of the reactants often occurs. Furthermore, because of the limitations on the starting materials, the prior art processes are generally directed to the preparation of benzyl acetate and related esters.

Now, in accordance with this invention, we have discovered a method for preparing esters, particularly aryl methyl esters and others as herein defined, wherein a starting reactant is a mixed acetic-acyl anhydride instead of the symmetrical anhydride used in the prior art. Accordingly, the process of this invention provides a ready means of preparing esters higher than acetates and in higher yields.

It becomes, therefore, a primary object of this invention to provide an improved method of preparing esters.

Another object of this invention is to provide a method of preparing arylmethyl esters.

Another object of this invention is to provide a method of preparing alicyclic olefinic esters.

Another object of this invention is to provide a method of preparing cyclic olefinic esters.

Another object of this invention is to provide a method of preparing acetylenic esters.

A further object of this invention is to provide a method of preparing esters using mixed acetic-acyl anhydride as one of the starting reactants.

Another object of this invention is to provide a process wherein a mixed acetic-acyl anhydride is reacted with a halide of a methyl-substituted aromatic compound, an allylic olefin halide, a cyclic olefin halide, or an acetylenic halo-compound in the presence of a catalyst under conditions such that the acetyl halide formed in the reaction is continuously distilled therefrom.

These and other objects of this invention will be described or become apparent as the specification proceeds.

The method of this invention, in general, comprises reacting a mixed organic acid anhydride, in which the acyl radicals differ by at least one carbon atom, with an organic halide in which the halogen is attached through a methylene group to an unsaturated carbon atom or directly to a terminal acetylenic or ethyne group. The reaction of this invention is carried out in the presence of a catalyst such as antimony pentasulfide, phosphorus pentasulfide, or phosphorus pentoxide at a temperature sufficiently high to distill the acetyl chloride by-product from the reaction mixture. The halide-to-anhydride molar ratio used in carrying out the reaction of this invention has been found to be essentially critical and must be greater than one and not more than three, and is preferably about two. That is, more than one mole of halide is charged per mole of anhydride. In accordance with one feature of this invention, it has been found that the proper choice of halide-to-anhydride molar ratio greatly reduces charring and polymerization during the reaction, and enhances the yield of the desired esters.

The process of this invention may be represented by the generalized reactions:

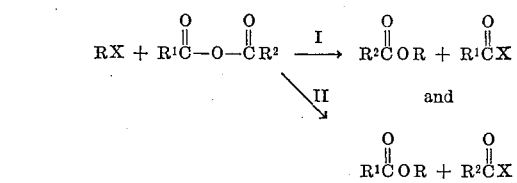

wherein reaction I is made to predominate almost exclusively by the selection of an $R^2$ group which forms an acyl halide,

boiling at least about 50° C. higher than the acyl halide,

thus the latter, having a lower boiling point, is readily removed from the reaction mixture and the products of reaction II reform the reactants which in turn react in accordance with reaction I. This feature of this invention brought about by this difference in boiling point not only assists in causing the reaction to proceed but also permits the continuous distillation of the acyl halide from the reaction mixture. The application of the continuous distillation technique causes substantially exclusive reaction of the heavier or higher molecular weight acyl group with the halide reactant.

The process of this invention has the further advantage that the acrylic halide, readily distilled from the reaction mixture during the course of the reaction, is easily converted back to the mixed acetic-acyl anhydride for recycle. Thus, only the portion of the anhydride actually combined with the starting halide to form the desired ester is consumed in the reaction.

The process of this invention applies to wide selection of organic halides containing one or more —C=C—CH₂X, —C≡C—CH₂X, $$-C=C-X$$
$$\phantom{-C=C-}H$$

or —C≡C—X groups, X being a halogen, and can be used to prepare both mono-, di-, or polyesters as long as the reactant proportions, boiling point considerations and reaction conditions specified herein are used.

In order to demonstrate the invention, the following examples are given:

*Example I*

This example is shown to demonstrate the method of the prior art as follows:

Sixty-four grams (0.5 mole) of benzyl chloride, 102 g. (1 mole) or acetic anhydride, and 1 g. of zinc oxide were charged to a flask fitted with a fractionating column, and the mixture was heated. Shortly after heating was started, a violent exothermic reaction occurred. Sixty percent of the theoretical amount of acetyl chloride was removed through the fractionating column in two hours, but this was all that could be obtained. Extensive polymerization had occurred. No benzyl acetate was obtained from the mixture; apparently any that had formed had subsequently decomposed.

*Example II*

The importance and effectiveness of reversing the molar ratio of reactants, and of using a less active catalyst, in the formation of esters by the reaction of a halide with an anhydride was demonstrated as follows:

Sixty-four grams (0.5 mole) of benzyl chloride, 26 g. (0.25 mole) of acetic anhydride, and 0.25 g. of antimony pentasulfied were placed in a reaction flask fitted with a fractionating column, and the mixture was heated. At the end of two hours, evolution of acetyl chloride had ceased, and excess benzyl chloride was distilled from the mixture. The reaction yield of benzyl acetate was 90% of theory.

*Example III*

The process of this invention is illustrated as follows:

Acetic-valeric anhydride is prepared for use in the process by mixing two moles (164 g.) of anhydrous sodium acetate with one mloe (118.5 g.) of valeryl chloride in a flask equipped with thermometer, stirrer, and reflux condenser. The mixture is heated at 120° C. for one hour, after which it is cooled, and the salts are filtered off to obtain 142 g. of acetic-valeric anhydride.

In accordance with this invention, two mole (253 g.) of benzyl chloride, one mole (142 g.) of acetic-valeric anhydride, and 1.4 g. of antimony pentasulfide are charged to a reaction vessel equipped with a distillation column, and the mixture is heated. The acetyl chloride evolved from the reaction mixture is withdrawn as overhead from the fractionating column and, after evolution of acetyl chloride has ceased, the excess benzyl chloride is distilled from the reaction mixture and the benzyl valerate product is recovered in high yield.

*Example IV*

Reaction of benzyl chloride with acetic valeric anhydride:

Into a 250 cc. flask, equipped with distillation column were charged 9.665 moles (84.3 g.) benzyl chloride, 0.328 mole (47.3 g.) acetic valeric anhydride, and 0.5 g. antimony pentasulfide. The mixture was heated for approximately 7 hours at 183°–200° C. When evolution of acetyl chloride stopped, the reaction was considered complete. The unreacted benzyl chloride was distilled off and the product was fractionated. Benzyl valerate was recovered in 40% yield, based on anhydride charged.

In fractionation, the following major cuts were obtained:

| Cut No. | Weight (g.) | Boiling Range, ° C. | R.I. at 20° C. | Percent Recovery |
|---|---|---|---|---|
| I | 4.1 | 30–64° at 0.040 mm | 1.4565 | 6.4 |
| II | 25.3 | 64–85° at 0.040 mm | 1.4762 | 40.0 |
| III | 13.3 | 86–200° at 0.062 mm | 1.5308 | 20.8 |
| Loss | | | | 4.0 |

Saponification number required is 292, found on Cut II was 295. Carbon required is 75.0%, found on Cut II was 71.5% and Cut III was 75.1%. Hydrogen required is 8.3%, found on Cut II was 8.5% and Cut III was 7.5%.

*Example V*

Reaction of benzyl chloride with acetic benzoic anhydride:

Into a 500 cc. flask equipped with a distillation column was charged 1 mole (109.3 g.) acetic-benzoic anhydride, 1.33 mole (168.7 g.) benzyl chloride, and 1.3 g. antimony pentasulfide. The mixture was heated for 20 hours at 175°–180° C., after which the absence of acetyl chloride from the condenser effluent indicated the reaction was complete. The unreacted benzyl chloride was removed by distillation, and the residue was fractionated. Benzyl benzoate was recovered in 63.5 percent yield, based on acetic benzoic anhydride charged.

The starting organic halide to be used in the reaction of this invention may be any halide having the formula (1) $\qquad R—(X)_n$ wherein R is an organic radical or substituted organic radical which does not deactivate the halogen. Halogen compounds coming within the scope of this invention can be any organic halide which is activated, that is, containing a substituent in the molecule which enhances the activity of the halogen, which substituents are well known in the art. More specifically, the invention is directed to two classes of halides that are effective in the process, namely any aliphatic bromide and iodide that is not deactivated and all aliphatic chlorides, bromides and iodides that are activated. The term aliphatic in this definition is intended to include all compounds having a —CH₂X group regardless of the type of substituent to which it is attached.

Thus in the Formula 1, R is any substituent which does not deactivate the halogen (X) or is any substituent which activates the halogen. R can be $C_3$ to $C_7$ cycloaliphatic, $C_1$–$C_{20}$ alkyl-substituted $C_3$–$C_7$ cycloaliphatic, $C_1$ to $C_{20}$ aliphataic, when X is bromine or iodine, and R can be any $C_6$ to $C_{18}$ aryl (having 6 to 18 cyclic carbon atoms) $C_1$ to $C_{20}$ alkyl-substituted $C_6$–$C_{18}$ aryl, or any heterocyclic group such as five-membered heterocyclic groups having one or two hetero-atoms (O, S or NH) which do not have a deactivating influence on the halogen, and the like, when X is chlorine, bromine or iodine and R can be a group which enhances the activity of a chloro, bromo or iodo group to include but not being limited to

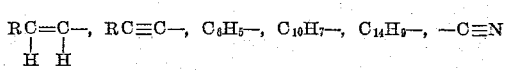

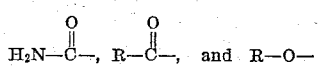

wherein R is a group as heretofore defined. Fluoro compounds are included within the scope of this invention; however, because of their relative inactivity and expense, best results are obtained with the other halogen compounds. A preferred group of organic halides for use in accordance with this invention are defined by Formula 1 wherein R is a hydrocarbon radical having 2 to 60 carbon atoms of aliphatic, cycloaliphatic or aromatic configuration, heterocyclic radical, as heretofore defined, or combination aliphatic-heterocyclic, cycloaliphatic-heterocyclic, aromatic-heterocyclic radical having up to 60 carbon atoms and also containing other elements (O, S, N) and non-interferring substituents, containing the following structures

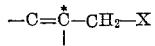

wherein the beta-carbon atoms* relative to X (the halogen) is unsaturated (olefinic) or part of an aromatic ring, cycloolefinic ring, or heterocyclic ring or containing the structure

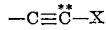

wherein the alpha-carbon atom** relative to X (the halogen) is acetylenic or ethynyl, and X is a halogen (Cl, Br, I or F). Any acetylenic halide having the

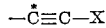

structure can be used in accordance with this invention, to include the class of compounds known as aliphatic acetylenic halides, alicyclic acetylenic halides, and aromatic acetylenic halides, wherein the remaining valence of the carbon atom (*) in beta-position to the halogen is connected to any organic nucleus which does not interfere with the reaction. Certain compounds having the structure R—C≡C—CH$_2$X, wherein R is hydrogen or any of the foregoing radicals assigned to R may also be used, i.e., propargyl chloride, bromide or iodide.

The halogen compounds used as reactants in accordance with the broadest aspects of this invention or in accordance with the preferred embodiments can have 1 to 10 reactive halo-groups or more, and preferably 1 to 5 halo groups; $n$ thus having the value 1 to 10 and preferably 1 to 5, depending on the configuration of R. In the preferred aspect of this invention R is allylic, olefinic, aromatic, heterocyclic, cyclo-olefinic or acetylenic in character and contains 2 to 60 carbon atoms or more depending on its configuration and the number of non-interferring substituents.

The choice of the organic halide for this reaction is made apparent from the foregoing general discussion, the following specific examples and from the known activities of these compounds as set forth in the text "Organic Synthesis," vol. I, pages 526–533, by V. Migrdichain.

Specific examples of aliphatic bromides and iodides that are not deactivated and can be used in the reaction are the simple aliphatic bromides and iodides such as

| | |
|---|---|
| methylbromide | 1-bromoheptane |
| methyliodide | 1-iodoheptane |
| ethylbromide | 1-bromooctane |
| ethyliodide | 1-iodooctane |
| 1-bromopropane | 1-bromononane |
| 1-iodopropane | 1-iodononane |
| 1-bromobutane | 1-bromodecane |
| 1-iodobutane | 1-iododecane |
| 1-bromopentane | 1-bromoundecane |
| 1-iodopentane | 1-iodoundecane |
| 1-bromohexane | 1-bromododecane |
| 1-iodohexane | 1-iodododecane |
| 1-bromotridecane | 1-iodotridecane |
| 1-bromotetradecane | 1-iodotetradecane |
| 1-bromopentadecane | 1-iodopentadecane |
| 1-bromohexadecane | 1-iodoheptadecane |
| 1-bromoactadecane | 1-iodononadecane |
| 1-bromoeicosane | 2-bromopentane |
| 3-iodoeicosane | 2-iodoundecane |

The iodides and bromides with an olefinic or aromatic double bond in the alpha position to the halogen atom are deactivated for purpose of this invention by unsaturation. Thus such compounds as vinyl bromide, vinyl iodide, 1-bromo-1-propene, 1-iodo-1-propene, phenyl bromide and phenyl iodide cannot be used.

Where R in Formula 1 is an allylic olefinic radical having 3 to 20 carbon atoms, a preferred sub-genus of organic halide starting materials is illustrated by:

| | |
|---|---|
| allyl chloride | 3-bromo-1-pentene |
| allyl bromide | 3-chloro-1-pentene |
| allyl iodide | 3-iodo-1-pentene |
| allyl fluoride | 3-fluoro-1-pentene |
| 2,3-dichloropropene | 3-bromo-1-hexene |
| 2,3-dibromopropene | 3-chloro-1-hexene |
| 2,3-diiodopropene | 3-iodo-1-hexene |
| 2,3-difluoropropene | 3-fluoro-1-hexene |
| 3-chloro-1-butene | 3-bromo-1-heptene |
| 3-bromo-1-butene | 3-chloro-1-heptene |
| 3-iodo-1-butene | 3-iodo-1-heptene |
| 3-fluoro-1-butene | 3-fluoro-1-heptene |
| 1-bromo-2-butene | 3-bromo-1-octene |
| 1-chloro-2-butene | 3-chloro-1-octene |
| 1-iodo-2-butene | 3-iodo-1-octene |
| 1-fluoro-2-butene | 3-fluoro-1-octene |
| 1,4-dibromo-2-butene | 3-chloro-1-nonene |
| 1,4-dichloro-2-butene | 3-chloro-1-decene |
| 1,4-diiodo-2-butene | 3-chloro-1-dodecene |
| 1,4-difluoro-2-butene | 3-chloro-1-octadecene | and the like.

Where R is of aromatic character, the organic halide starting materials include those compounds having aromatic radicals of 6, 10, 14, or 18 cyclic carbon atoms connected to the halogen through a methylene group, such as those compounds of the formula (2)             $R^3—(CH_2X)_m$ wherein $R^3$ is $C_6$, $C_{10}$, $C_{14}$ or $C_{18}$ aromatic, i.e., phenyl, naphthyl, anthryl and phenanthryl or the corresponding substituted aromatic radicals having $C_1$ to $C_{20}$ alkyl radicals, or having $C_3$ to $C_7$ cycloalkyl radicals attached to the ring carbon atoms, X is halogen and $m$ is 1 to 10 depending on the aromatic nucleus.

Examples of starting materials of this nature are benzyl chloride, benzyl fluoride, benzyl iodide, benzyl bromide, α - (chloromethyl)naphthalene, β - (chloromethyl)naphthalene, α - (fluoromethyl)naphthalene, β - (fluoromethyl)naphthalene, α - (iodomethyl)naphthalene, β - (iodomethyl)naphthalene, α - (bromomethyl)naphthalene, β-(bromomethyl)naphthalene, α - (chloromethyl)anthracene, β - (chloromethyl)anthracene, α - (fluoromethyl)anthracene, β-(fluoromethyl)anthracene, α-(iodomethyl)anthracene, β-(iodomethyl)anthracene, α-(bromomethyl)anthracene, β-(bromomethyl)anthracene.

Other examples of aromatic starting materials include: α-chloro-o-xylene, α-iodo-o-xylene, α-fluoro-o-xylene, α-bromo-o-xylene, α-chloro-p-xylene, α-bromo-p-xylene, α-iodo-p-xylene, α-fluoro-o-xylene, α-chloro-m-xylene, α-iodo-m-xylene, α-bromo-p-xylene, α,α-dichloro-m-xylene, α,α-dibromo-m-xylene, α,α-diiodo-m-xylene, α,α-difluoro-m-xylene, α,α-dichloro-o-xylene, α,α-dibromo-o-xylene, α,α-difluoro-p-xylene, α,α-dichloro-p-xylene, α,β-dichloromethyl-naphthalene, α,β-dibromomethyl-napthtalene, 1,3-dichloromethyl-naphthalene, 1,6-dichloromethyl-naphthalene, 1,3-dichloromethyl-anthracene, 1,2-dichloromethyl-phenanthrene, 1,6-dibromomethyl-phenanthrene.

Where R is of heterocyclic character the organic halide starting materials include those compounds of the formula (3)             

wherein $R^4$ is furyl, thiophenyl, pyrryl, isopyrryl, thiazolyl, isothiazolyl, benzofuryl, isobenzofuryl, thionaphthyl, isothionaphthyl, isoquinoline and the like and $y$ is 1 to 4.

Examples of starting materials under Formula 3 are: 2-chloromethylfuran, 2-bromomethylfuran, 2-iodomethylfuran, 2-fluoromethylfuran, 3-chloromethylfuran, 3-bromomethylfuran, 2,3-dichloromethyl-furan, 2,3-dibromomethylfuran, 2-chloromethylthiophene, 3-bromomethylthiophene, 2,3-diiodomethylthiophene, 2,3,4-trichloromethylthiophene, 3-chloromethylpyrrole, 4-chloromethylisopyrrole, 2-chloromethylthiazole, 4,5-dichloromethylisothiazole, 2,3-dibromomethylbenzofuran, 6,7-dichloromethylisobenzofuran, 3,4-dibromomethylthionaphthene, 4,5,6-trichloromethylisothionaphthene, and the like.

The alicyclic olefinic compounds used as starting materials may have the formulae:

(4) $R^5—(CH_2X)_z$ or (5) $R^5—(X)_p$ wherein in Formula 4 $R^5$ is a $C_3$ to $C_7$ cycloolefinic group in which the $—CH_2X$ group is attached to an unsaturated carbon atom or wherein in Formula 5 (X) is attached to a methylene carbon atom adjacent an unsaturated carbon atom; X being a halogen and $z$ and $p$ being integers of 1 to 2 for the monoolefinic series and 1 to 4 for the diolefinic series, e.g.:

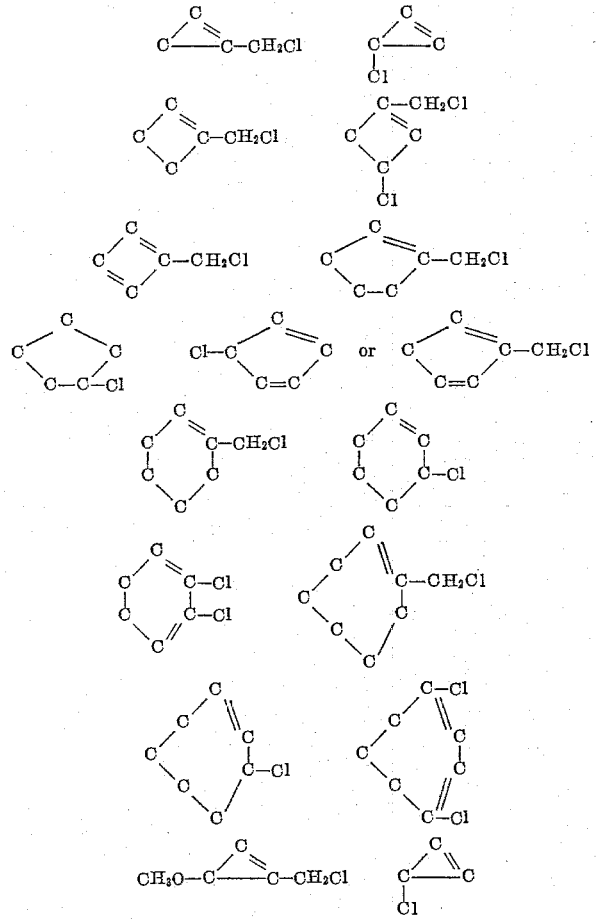

3-methoxy-1-chloromethylcyclopropene, 3-chloro-1,2 cyclop propene, are defined.

Examples of alicyclic olefinic compounds are: 2-cyclopentenyl chloride, 2-cyclopentenyl bromide, 2-cyclopentenyl iodide, 2-cyclopentenyl fluoride, 3-bromocyclohexene, 3-iodocyclohexene, 3-fluorocyclohexene, 3-chlorocyclohexene, 1-chloro-1-cyclohexene, 1-bromo-1-cyclohexene, 1-fluoro-1-cyclohexene, 1-iodo-1-cyclohexene, 1-cyclopentenyl-methyl bromide, 1-cyclohexenyl-methyl bromide, 1-cycloheptenyl-methyl bromide, 2-cyclopentenyl-methyl iodide, 2-cyclopentenyl-ethyl bromide, 1-cyclohexenyl ethyl bromide, 3-cyclopentyl-2-bromopropene, 2-cyclopentenylbutyl bromide, and 3-cyclohexyl-2-bromopropene.

Acetylenic starting materials include those having a total of 2 to 10 carbon atoms such as chloro-acetylene dichloroacetylene, diiodoacetylene, 1-chloro-1-butyne, 1-iodo-1-butyne, 1-chloro-1-pentyne, 1-iodo-1-pentyne, 1-bromo-1-pentyne, 1-bromo-1-hexyne, 1-iodo-1-hexyne, 1-chloro-1-hexyne, 1-bromo-1-hexyne, 1-chloro-2-hexyne, 1-iodo-1-hexyne, 3-chloro-3-methyl-4-pentyne, 1-chloro-1-heptyne, 1-bromo-1-heptyne, 1-iodo-1-heptyne, 1-bromo-2-heptyne, 1-chloro-2-heptyne, 1-iodo-2-heptyne, 1-bromo-4,4 - dimethyl-2-pentyne, 1-chloro-1-octyne, 3-chloro-3-methyl-4-heptyne, cyclohexylchloroacetylene, cyclohexylbromoacetylene, cyclohexyliodoacetylene, n-heptylchloroacetylene, 2-chloro-2-methyl-3-octyne, t-butylethynyldimethylcarbinyl chloride.

The allylic olefinic halides, aromatic halides, heterocyclic halides, alicyclic olefinic halides and acetylenic halides may all have various substituent groups attached to the principal R, $R^3$, $R^4$, $R^5$ or $R^6$ nucleus, which do not interfere with the reaction. Included in such substituents are hydrocarbon radicals having 1 to 20 carbon atoms of straight, branched or cyclic configuration, the corresponding alkoxy groups, keto, nitro halogen, sulfato and similar groups. Any such starting halogen compound is suitable for the reaction in a preferred embodiment of this invention as long as the primary reactant group contains an unsaturated beta-carbon atom relative to the halogen or contains an acetylenic or ethynyl alpha-carbon atom relative to the halogen. A preferred group of such compounds includes benzyl chloride, benzyl iodide, benzyl bromide, α-(chloromethyl)naphthalene, β-(chloromethyl) naphthylene, α-chloro-o-xylene, allyl chloride, 2,3-dichloropropene, valeryl chloride, 2-chloromethylfuran, 1-chloromethyl-cyclopropene, dichloroacetylene, and 1-chloro-1-butyne.

The mixed anhydride used in accordance with this invention may be any mixed acid anhydride having a difference of at least one $—CH_2—$ group in the two acyl groups thereof, whereby the acyl halide and ester products have a difference in boiling point such that separation by distillation or other means is facilitated. A preferred group of mixed anhydrides is the acetic-acyl anhydrides having the formula

wherein $R^1$ and $R^2$ are different aliphatic radicals having 1 to 20 carbon atoms, same being either of straight or branched chain configuration; or different $C_6$ to $C_{14}$ aromatic radicals, e.g., phenyl, naphthyl and anthryl; and the corresponding $C_1$ to $C_{10}$ alkyl-substituted $C_6$ to $C_{14}$ aromatic radicals, having 1 to 5 alkyl substituents wherein the acyl halides thereof having boiling points differing by at least about 50° F. Preferably $R^1$ is methyl and $R^2$ contains at least 3 carbon atoms in a preferred embodiment of this invention. Examples of such anhydrides are acetic-propionic anhydride, acetic-butyric anhydride, acetic-isobutyric anhydride, acetic-valeric anhydride, acetic-isovaleric anhydride, acetic-isocaproic anhydride, acetic-methyl-n-propyl acetic anhydride, acetic-diethyl-acetic anhydride, acetic-dimethyl ethyl acetic anhydride, acetic-tert-butyl acetic anhydride, acetic-methyl-iso-propylacetic anhydride, acetic-n-heptoic anhydride, acetic-n-octoic anhydride, acetic-n-nonoic anhydride, acetic-n-decoic anhydride and the like. Examples of mixed anhydrides of aromatic series are acetic-benzoic anhydride, acetic-2-methyl benzoic anhydride, acetic-naphthoic anhydride, acetic-anthroic anhydride and the like.

The method of this invention is readily carried out and no precautions need be taken aside from those normally accompanying this type of reaction. The reactants are merely mixed together in the presence of a catalytic amount of antimony pentasulfide, phosphorus pentasulfide or phosphorus pentoxide, or mixtures of same, and heated to a temperature sufficient to cause the reaction to proceed. The reaction can be carried out at 100° C. to 300° C., provided the reactants and the products are stable.

Pressures in the order of atmospheric to 100 p.s.i.g. may be used. A preferred procedure is to heat the reactants to a temperature high enough to cause the acetyl chloride or other halide by-product to distill and to provide the proper reflux conditions to return any distillate other than the halide to the reactor. Generally, the reaction is exothermic, and heat, if any, is applied gradually to avoid loss due to rapid boiling.

The evolution of the acetyl halide is an indication that the reaction is proceeding. The acetyl halide can be removed by fractionation as fast as it forms. The reaction is complete in 1 to 3 hours. After the major portion of the acetyl halide has been removed, any excess reactant is removed by further distillation and the ester product remains as the residue.

The yield of ester product is enhanced by using an excess over molar ratios of the organic halide reactant to the anhydride, i.e., mole ratios in the order of 1.1/1.0 to 3.0/1.0 and preferably about 2.0/1.0 are used. Charring and/or polymerization are avoided by this expedient. The acetyl halide by-product may be converted back to the mixed anhydride for recycle in the reaction, such as by mixing the acetyl halide with the alkali metal salt of the desired acid and heating to a temperature sufficient to promote the reaction, e.g., about 100° to 150° C. for about ½ to 3 hours under reflux. The reaction may be carried out without a catalyst, but economics indicate the desirability of using a catalyst in the amount of about 0.001% by weight to 0.01% by weight, based on the total reactants.

The embodiments of the invention in which an exclusive property or privilege is claimed are defined as follows:

1. The process of producing esters of organic acids which comprises reacting a mixed organic anhydride of the formula

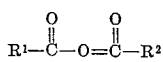

wherein $R^1$ and $R^2$ are different substituents of the group consisting of $C_1$ to $C_{20}$ alkyl, $C_6$ to $C_{14}$ aryl, $C_1$ to $C_{20}$ alkyl-substituted $C_6$ to $C_{14}$ aryl, $R^1$ and $R^2$ differing such that their respective acyl halides have boiling points at least about 50° C. apart, with a molar excess of an organic halogen compound of the formula

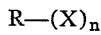

wherein X is an active halogen, $n$ is an integer of 1 to 10 and R is an organic radical having up to 60 carbon atoms, at a temperature of about 100° C. to 300° C. in the presence of a catalyst of the group consisting of antimony pentasulfide, phosphorus pentasulfide, phosphorus pentoxide and mixtures thereof, and separating from the reaction products the ester of the higher-boiling acyl group with said organic halogen compound and the acyl halide of the lower-boiling acyl group.

2. The process in accordance with claim 1 in which the molar ratios of said organic halogen compound and said organic acid anhydride are about 1.1/1.0 to 3.0/1.0.

3. The process in accordance with claim 1 in which $R^1$ and $R^2$ are $C_1$ to $C_{20}$ alkyl, R is aryl alkyl having aromatic unsaturation in beta-position to X and X is chlorine.

4. The process in accordance with claim 3 in which $R^1$ is methyl, $R^2$ is butyl and R is benzyl.

5. The process in accordance with claim 1 in which $R^1$ is $C_1$ to $C_{20}$ alkyl, $R^2$ is $C_6$ to $C_{18}$ aryl, R is benzyl and X is chlorine.

6. The process in accordance with claim 5 in which $R^1$ is methyl, $R^2$ is phenyl and R is benzyl.

7. The process of producing benzyl benzoate which comprises reacting about one mole of acetic-benzoic anhydride with about two moles of benzyl chloride in the presence of antimony pentasulfide at a temperature sufficiently high to vaporize and remove acetyl chloride from said reaction and recovering benzyl benzoate as the primary product.

8. The process of producing benzyl esters which comprises reacting a stoichiometric excess of a benzyl halide with a mixed acetic acid anhydride having acyl groups differing by at least one methylene group such that the acyl halides thereof boil about 50° C. apart, in the presence of antimony pentasulfide at a temperature of about 100° to 300° C. and separating benzyl esters from the reaction products.

9. The process of producing benzyl valerate which comprises reacting about 1 mole of acetic-valeric anhydride with about 2 moles of benzyl chloride in the presence of antimony pentasulfide at a temperature of 100° C. to 300° C., removing acetyl chloride from said reaction and recovering benzyl valerate as the primary product.

References Cited by the Examiner
FOREIGN PATENTS 169,040   7/1934   Switzerland.

OTHER REFERENCES

Greenstein: Chemistry of the Amino Acids, vol. 2, pp. 970–8 (1961).

LORRAINE A. WEINBERGER, *Primary Examiner.*

LEON ZITVER, *Examiner.*

D. P. CLARKE, V. GARNER, *Assistant Examiners.*